United States Patent
Kuo et al.

(10) Patent No.: US 12,219,227 B2
(45) Date of Patent: Feb. 4, 2025

(54) OPTICAL IMAGE STABILIZATION MODULE AND ELECTRONIC DEVICE

(71) Applicant: HUAWEI TECHNOLOGIES CO., LTD., Shenzhen (CN)

(72) Inventors: Li-Te Kuo, Dongguan (CN); Kuni Lee, Shenzhen (CN); Hongbo Luo, Dongguan (CN); Jianwen Wang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 168 days.

(21) Appl. No.: 17/674,995

(22) Filed: Feb. 18, 2022

(65) Prior Publication Data

US 2022/0174189 A1 Jun. 2, 2022

Related U.S. Application Data

(63) Continuation of application No. PCT/CN2020/083671, filed on Apr. 8, 2020.

(30) Foreign Application Priority Data

Aug. 20, 2019 (CN) .......................... 201921349981.5

(51) Int. Cl.
*H04N 23/51* (2023.01)
*G02B 27/64* (2006.01)
(Continued)

(52) U.S. Cl.
CPC ........... *H04N 23/51* (2023.01); *G02B 27/646* (2013.01); *G03B 5/00* (2013.01); *H04N 23/55* (2023.01); *G03B 2205/0007* (2013.01)

(58) Field of Classification Search
CPC ...... H04N 23/51; H04N 23/55; H04N 23/687; H04N 23/57; H04N 23/54; G02B 27/646;
(Continued)

(56) References Cited

U.S. PATENT DOCUMENTS

2009/0052037 A1  2/2009  Wernersson
2011/0150442 A1  6/2011  Ollila et al.
(Continued)

FOREIGN PATENT DOCUMENTS

CN  204536703 U  8/2015
CN  105573014 A  5/2016
(Continued)

*Primary Examiner* — Christopher K Peterson
(74) *Attorney, Agent, or Firm* — Maier & Maier, PLLC (57) ABSTRACT

An optical image stabilization module and an electronic device. The optical image stabilization module includes a first bracket, a second bracket, and a third bracket that are nested in sequence from inside to outside, and an optical lens module fixed on the first bracket. A first connection assembly is arranged between the first bracket and the second bracket, to enable the first bracket and the second bracket to form a rotational connection about a first rotation axis. A second connection assembly is arranged between the second bracket and the third bracket, to enable the second bracket and the third bracket to form a rotational connection about a second rotation axis. The first rotation axis, the second rotation axis, and an optical axis of the camera are perpendicular to each other.

20 Claims, 10 Drawing Sheets

(51) Int. Cl.
*G03B 5/00* (2021.01)
*H04N 23/55* (2023.01)

(58) Field of Classification Search
CPC .............. G03B 5/00; G03B 2205/0007; G03B 2205/0023; G03B 2205/0069; G03B 3/10; G03B 5/06; G03B 30/00; G03B 5/02; G03B 17/02; G03B 2205/0046; H02K 41/0356; H02K 33/18
See application file for complete search history.

(56) References Cited

U.S. PATENT DOCUMENTS

| | | | |
|---|---|---|---|
| 2013/0223829 A1* | 8/2013 | Nakayama | G02B 27/64 |
| | | | 396/55 |
| 2014/0362242 A1* | 12/2014 | Takizawa | H04N 23/55 |
| | | | 348/208.11 |
| 2015/0071627 A1 | 3/2015 | Hoang | |
| 2016/0241786 A1 | 8/2016 | Minamisawa | |
| 2017/0273171 A1* | 9/2017 | Codd | H04N 25/617 |

FOREIGN PATENT DOCUMENTS

| | | |
|---|---|---|
| CN | 108427235 A | 8/2018 |
| CN | 109348102 A | 2/2019 |
| CN | 109413317 A | 3/2019 |
| CN | 109975973 A | 7/2019 |
| JP | 2013140285 A | 7/2013 |
| JP | 2014167603 A | 9/2014 |
| JP | 201580253 A | 4/2015 |
| JP | 2015106104 A | 6/2015 |

\* cited by examiner

OPTICAL IMAGE STABILIZATION MODULE AND ELECTRONIC DEVICE

CROSS-REFERENCE TO RELATED APPLICATIONS

This application is a continuation of International Application No. PCT/CN2020/083671, filed on Apr. 8, 2020, which claims priority to Chinese Patent Application No. 201921349981.5, filed on Aug. 20, 2019. The disclosures of the aforementioned applications are hereby incorporated by reference in their entireties.

TECHNICAL FIELD

The embodiments relate to the field of optical image stabilization technologies, an optical image stabilization module, and an electronic device.

BACKGROUND

With popularity of a new media mode and a new social interaction pattern such as a short video, a video weblog (VLOG), and live video streaming, an increasing number of users like recording or sharing a moment in life with others by shooting a video. To enable a user to shoot a high-quality video, hardware manufacturers provide optical image stabilization modules and electronic devices, which have an optical image stabilization (OIS) function.

Figure 1:
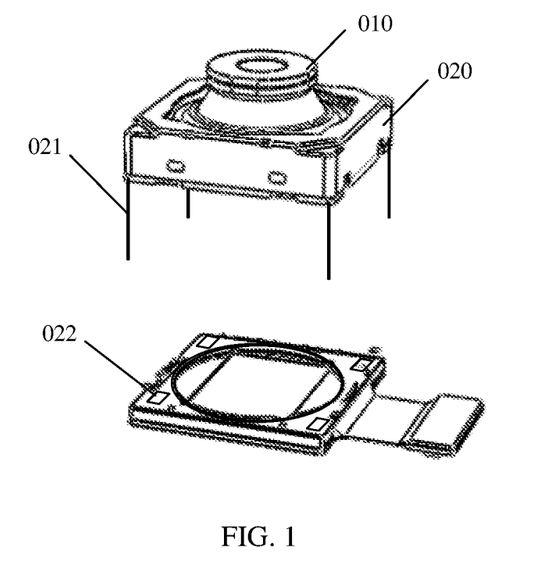
FIG. 1 is a schematic diagram of an optical image stabilization module in a current voice coil motor solution.

Currently, an optical image stabilization module that has an optical image stabilization function includes a lens and a voice coil motor. As shown in FIG. 1, a lens 010 can move horizontally by using a voice coil motor (voice coil motor, VCM) 020, thereby offsetting displacement caused by a shake to implement optical image stabilization. The voice coil motor 020 includes four suspension wires 021 that are configured to support the lens 010 and a coil 022 located below the lens 010. A magnetic field generated by energizing the coil 022 enables the optical image stabilization module to move horizontally to offset a shake, to implement image stabilization. However, because a suspension wire structure can only make horizontal displacement of a lens, an image stabilization angle of the lens is relatively small, and problems such as vignetting and optical axis offsetting are prone to occur. In addition, as an electronic device has an increasing high requirement on an optical property of a lens, a size and a weight of the lens are increasing. However, due to a relatively low strength, the suspension wire structure can only carry a lens with a relatively small size and a relatively light weight, but cannot carry a lens with a relatively large size and a relatively heavy weight. In addition, when the electronic device falls off or is hit, the suspension wire structure is prone to fracture, which causes optical image stabilization to fail and even causes the optical image stabilization module to fail to work properly.

SUMMARY

An optical image stabilization module and an electronic device may solve problems in a conventional technology that an optical image stabilization module and an electronic device equipped with the optical image stabilization module have a small image stabilization angle and a weak structural strength.

In a first aspect, an optical image stabilization module includes: a first bracket, where the first bracket is of an annular structure and forms a hollow cavity; an optical lens module, arranged in the cavity and fixed on the first bracket, where an optical axis of the optical lens module is parallel to a central axis of the cavity; a second bracket, where the second bracket is nested on an outer side of the first bracket; a first connection assembly, arranged between the first bracket and the second bracket, where the first bracket and the second bracket form a rotational connection about a first rotation axis by using the first connection assembly, and the first rotation axis is perpendicular to the optical axis; a third bracket, where the third bracket is nested on an outer side of the second bracket; and a second connection assembly, arranged between the second bracket and the third bracket, where the second bracket and the third bracket form a rotational connection about a second rotation axis by using the second connection assembly, where the second rotation axis is perpendicular to the optical axis and the first rotation axis.

The optical image stabilization module may be applied to various electronic devices, for example, a mobile phone, a tablet computer, an aerial photography aircraft, a pan-tilt-zoom device, and a motion camera. When shooting a photo or a video, the electronic device obtains posture data (for example, an angular acceleration) of the electronic device measured by a sensor such as a gyroscope, and generates angle variation amounts corresponding to the first rotation axis and the second rotation axis of the electronic device based on the posture data. A first driving assembly of the optical image stabilization module drives, based on the angle variation amount of the first rotation axis, the first bracket and the optical lens module to rotate relative to the second bracket, and a second driving assembly of the optical image stabilization module drives, based on the angle variation amount of the second rotation axis, the second bracket to rotate relative to the third bracket. In this way, an angle variation of the optical lens module caused by a shake of the electronic device is compensated, so that the optical lens module maintains an original field of view, thereby implementing large-angle optical image stabilization. In addition, the two rotation axes of the optical lens module are independently decoupled without being affected by each other, thereby eliminating a posture variation that is possibly generated in an image stabilization process.

Optionally, the optical image stabilization module includes two first connection assemblies, and the two first connection assemblies are passed through by the first rotation axis and are symmetrically arranged between the first bracket and the second bracket relative to the second rotation axis.

Optionally, the optical image stabilization module includes two second connection assemblies, and the two second connection assemblies are passed through by the second rotation axis and are symmetrically arranged between the second bracket and the third bracket relative to the first rotation axis.

Optionally, the optical image stabilization module further includes a first driving assembly, arranged between the first bracket and the second bracket, where the first driving assembly is offset from the first rotation axis and is configured to drive the first bracket and the second bracket to produce relative rotation about the first rotation axis.

Optionally, the optical image stabilization module further includes a second driving assembly, arranged between the second bracket and the third bracket, where the second driving assembly is offset from the second rotation axis and is configured to drive the second bracket and the third bracket to produce relative rotation about the second rotation axis.

Optionally, the optical image stabilization module includes at least two first driving assemblies, and the first driving assemblies are symmetrically distributed between the first bracket and the second bracket relative to the first rotation axis.

Optionally, the optical image stabilization module includes at least two second driving assemblies, and the second driving assemblies are symmetrically distributed between the second bracket and the third bracket relative to the second rotation axis.

In a second aspect, an electronic device is provided, including a housing, where the housing includes at least one camera hole; at least one optical image stabilization module, where the optical image stabilization module is arranged in the camera hole; an image sensor, arranged on a light outlet side of the optical image stabilization module; a module flexible printed circuit board (FPC), where the module FPC is electrically coupled to the image sensor, and the module FPC is further provided with a conducting terminal; and a printed circuit board (PCB), arranged in the housing, where the PCB is provided with a conducting socket, and the conducting terminal is plug-connected to the conducting socket.

The electronic device may be a mobile phone, a tablet computer, an aerial photography aircraft, a pan-tilt-zoom device, and a motion camera. When shooting a photo or a video, the electronic device obtains posture data (for example, an angular acceleration) of the electronic device measured by a sensor such as a gyroscope, and generates angle variation amounts corresponding to the first rotation axis and the second rotation axis of the electronic device based on the posture data (for example, an angular acceleration). A first driving assembly of the optical image stabilization module drives, based on the angle variation amount of the first rotation axis, the first bracket and the optical lens module to rotate relative to the second bracket, and a second driving assembly of the optical image stabilization module drives, based on the angle variation amount of the second rotation axis, the second bracket to rotate relative to the third bracket. In this way, an angle variation of the optical lens module caused by a shake of the electronic device is compensated, so that the optical lens module maintains an original field of view, thereby implementing large-angle optical image stabilization. In addition, the two rotation axes of the optical lens module are independently decoupled without being affected by each other, thereby eliminating a crosstalk (crosstalk) and a posture variation that are possibly generated in an image stabilization process.

DETAILED DESCRIPTION OF THE EMBODIMENTS

An optical image stabilization module and an electronic device may solve problems in a conventional technology that an optical image stabilization module and an electronic device equipped with the optical image stabilization module have a small image stabilization angle and a weak structural strength.

Figure 2:
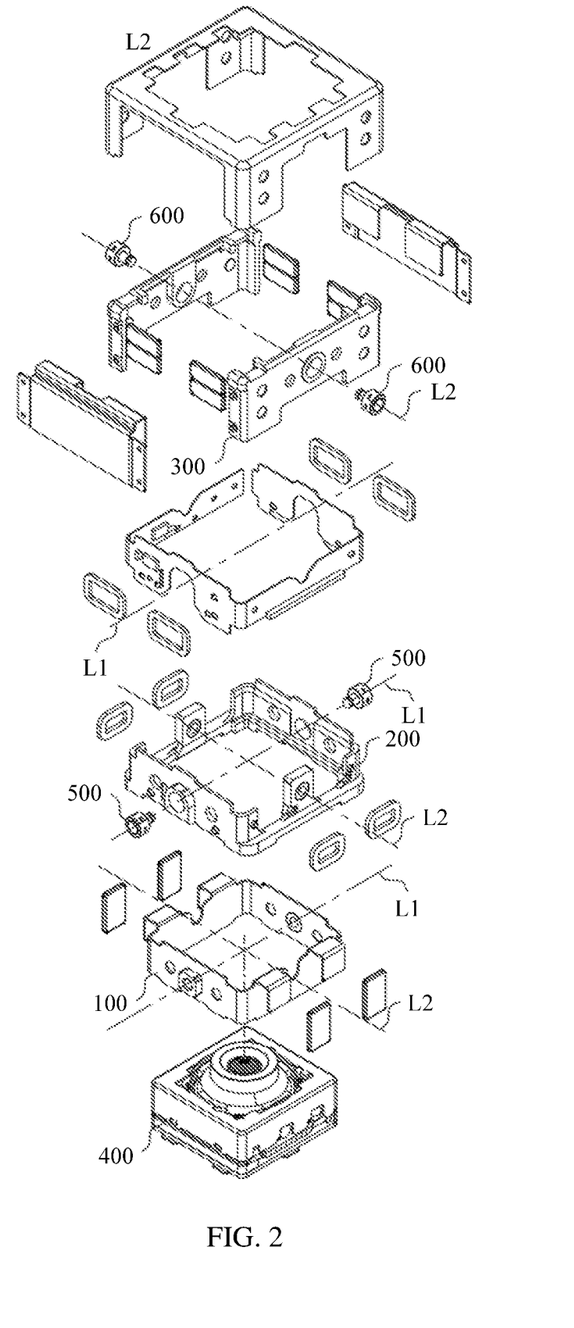
FIG. 2 is a structural exploded diagram of an optical image stabilization module according to a first embodiment.

The first embodiment provides an optical image stabilization module. FIG. 2 is a structural exploded diagram of the optical image stabilization module according to the first embodiment. As shown in FIG. 2, the optical image stabilization module includes: a first bracket 100, a second bracket 200, a third bracket 300, an optical lens module 400, and a first connection assembly 500 configured to enable the first bracket 100 and the second bracket 200 to rotate about a first rotation axis L1, and a second connection assembly 600 configured to enable the second bracket 200 and the third bracket 300 to rotate about a second rotation axis L2. The following describes a structure of the optical image stabilization module according to the first embodiment with reference to more accompanying drawings.

Figure 3:
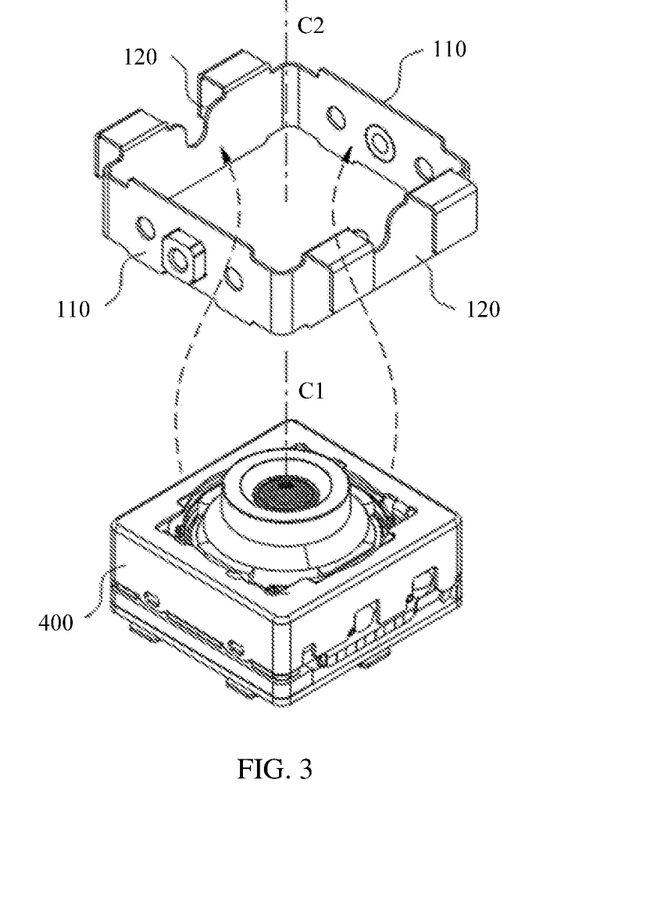
FIG. 3 is a schematic diagram of connection between an optical lens module and a first bracket according to the first embodiment.

FIG. 3 is a schematic diagram of connection between the optical lens module 400 and first bracket 100 according to the first embodiment. As shown in FIG. 3, the first bracket 100 is of an annular structure and has a hollow cavity. The first bracket 100 has a width along a direction of a central axis C2 of the cavity to form a sidewall.

Further, as shown in FIG. 3, the first bracket 100 may be of a rectangular structure. When the first bracket 100 is of a rectangular structure, the first bracket 100 may be considered to be formed by connecting two pairs of mutually-parallel sidewalls. For ease of description, one pair of mutually-parallel sidewalls may be referred to as first sidewalls 110, and the other pair of mutually-parallel sidewalls may be referred to as second sidewalls 120. The optical lens module 400 is arranged in the cavity of the first bracket 100, and forms a nested connection with the first bracket 100, to be fixed on the first bracket 100. An optical axis C1 of the optical lens module 400 is parallel to the central axis C2 of the cavity of the first bracket 100.

Figure 4:
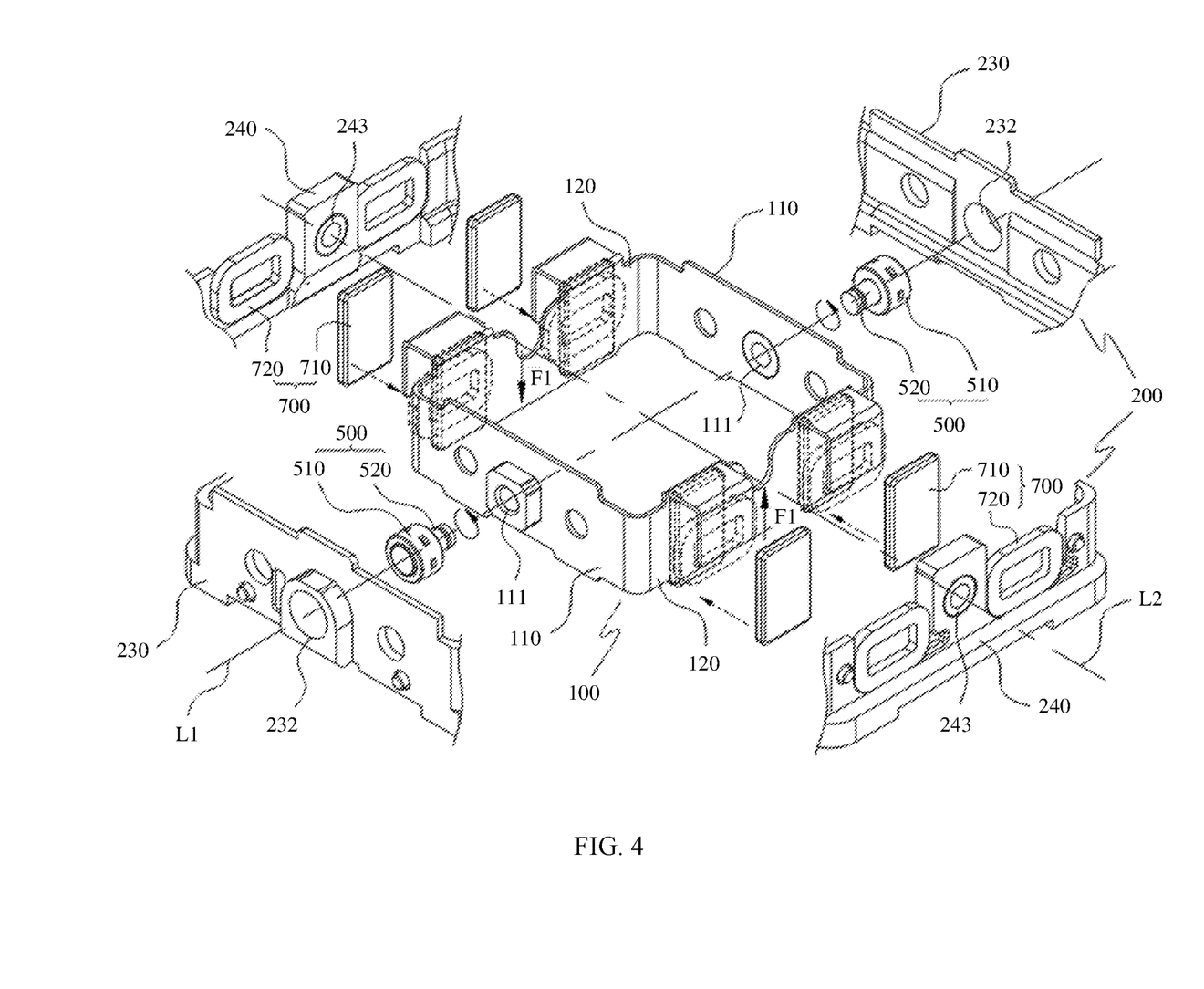
FIG. 4 is a schematic diagram of connection between the first bracket and a second bracket according to the first embodiment.

FIG. 4 is a schematic diagram of connection between the first bracket 100 and the second bracket 200 according to the first embodiment. For ease of description of a connection relationship between the first bracket 100 and the second bracket 200, in FIG. 4, the second bracket 200 is truncated, and a structure of the second bracket 200 is broken down along a direction of the first rotation axis L1 and a direction of the second rotation axis L2. As shown in FIG. 4, the second bracket 200 has an annular structure that has a same shape as that of the first bracket 100 and a size larger than that of the first bracket 100, enabling the second bracket 200 to be nested on an outer side of the first bracket 100.

Further, as shown in FIG. 4, when the second bracket 200 is of a rectangular structure, the second bracket 200 may be considered to be formed by connecting two pairs of mutually-parallel sidewalls. For ease of description, one pair of mutually-parallel sidewalls may be referred to as third sidewalls 230, and the other pair of mutually-parallel sidewalls may be referred to as fourth sidewalls 240. In a description manner of FIG. 4, the third sidewall 230 is located on an outer side of the first sidewall 110, and the fourth sidewall 240 is located on an outer side of the second sidewall 120.

Further, as shown in FIG. 4, each first sidewall 110 of the first bracket 100 is provided with one first bearing-shaft connection hole 111, the first bearing-shaft connection hole 111 is located at a central position of the first sidewall 110, and two first bearing-shaft connection holes 111 are coaxial to the first rotation axis L1. The first rotation axis L1 is perpendicular to the optical axis of the optical lens module 400. Each third sidewall 230 of the second bracket 200 is provided with one second bearing-shaft connection hole 232, and the second bearing-shaft connection hole 232 is coaxial to the first bearing-shaft connection hole 111. Each fourth sidewall 240 of the second bracket 200 is provided with one third bearing-shaft connection hole 243, and two third bearing-shaft connection holes 243 are coaxial to the second rotation axis L2. The second rotation axis L2 is perpendicular to the optical axis of the optical lens module 400, and the second rotation axis L2 is also perpendicular to the first rotation axis L1. The first connection assembly 500 is arranged between the first bracket 100 and the second bracket 200. The first connection assembly 500 includes a first bearing 510 and a first shaft 520. One end of the first shaft 520 is arranged to penetrate through an inner ring of the first bearing 510, to form a bearing-shaft connection with the inner ring of the first bearing 510. The other end of the first shaft 520 is arranged to penetrate through the first bearing-shaft connection hole 111, to form a bearing-shaft connection with the first bearing-shaft connection hole 111. The first bearing 510 after being fitted with the first shaft 520 is arranged in the second bearing-shaft connection hole 232, so that an outer ring of the first bearing 510 forms a bearing-shaft connection with the second bearing-shaft connection hole 232. In this way, based on the structure shown in FIG. 4, the first bracket 100 and the second bracket 200 form a rotational connection about the first rotation axis L1 by using the first connection assembly 500.

It should be noted that, as shown in FIG. 4, corresponding to the two first bearing-shaft connection holes 111 of the first bracket 100 and the two second bearing-shaft connection holes 232 of the second bracket 200, the first embodiment may include two first connection assemblies 500.

Further, as shown in FIG. 4, at least one first driving assembly 700 is further arranged between the first bracket 100 and the second bracket 200. Each first driving assembly 700 includes one first magnet 710 and one first coil 720 that are respectively arranged on the second sidewall 120 of the first bracket 100 and the fourth sidewall 240 of the second bracket 200. The first driving assembly 700 is offset from the first rotation axis L1, so that the first bracket 100 and the second bracket 200 can be driven to produce relative rotation about the first rotation axis L1.

In an embodiment, as shown in FIG. 4, when the first bracket 100 and the second bracket 200 are of a rectangular structure, four first driving assemblies 700 are arranged between the first bracket 100 and the second bracket 200, and each two of the four first driving assemblies 700 serve as one group and are symmetrically distributed on two sides of the first rotation axis L1. For example, two first magnets 710 are arranged on each second sidewall 120 of the first bracket 100; and two first coils 720 are arranged on each fourth sidewall 240 of the second bracket 200. When the first bracket 100 is nested with the second bracket 200, in each first driving assembly 700, the first coil 720 and the first magnet 710 are distributed in parallel, so that the first coil 720 is located in a magnetic field generated by the first magnet 710. When the first coil 720 is energized, according to Fleming's Left-Hand Rule, the first coil 720 generates an ampere force F1 perpendicular to a direction of the magnetic field and a current direction (parallel to the direction of the optical axis C1). Therefore, by setting current directions of the first coils 720 on the two sides of the first rotation axis L1, directions of ampere forces F1 on the two sides of the first rotation axis L1 may be opposite, thereby forming rotational torque with the first rotation axis L1 as a center of an arm of force, to drive the first bracket 100 and the second bracket 200 to produce relative rotation about the first rotation axis L1.

Figure 5:
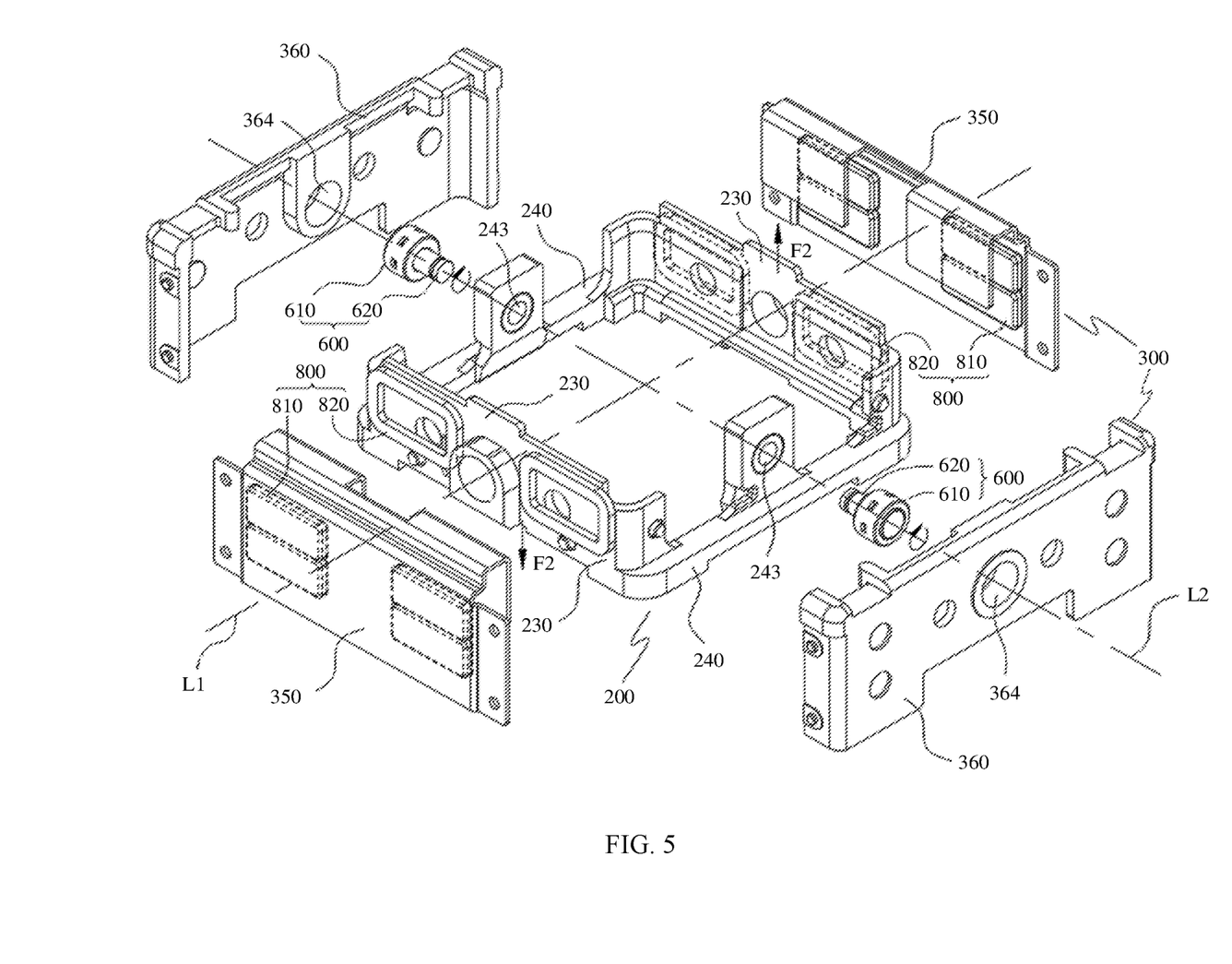
FIG. 5 is a schematic diagram of connection between the second bracket and a third bracket according to the first embodiment.

FIG. 5 is a schematic diagram of connection between the second bracket 200 and the third bracket 300 according to the first embodiment. For ease of description of a connection relationship between the second bracket 200 and the third bracket 300, in FIG. 5, a structure of the third bracket 300 is broken down along the direction of the first rotation axis L1 and the direction of the second rotation axis L2. As shown in FIG. 5, the third bracket 300 has an annular structure that has a same annular shape as that of the second bracket 200 and a size larger than that of the second bracket 200, enabling the third bracket 300 to be nested on an outer side of the second bracket 200. The third bracket 300 has a width along the direction of the central axis of the cavity to form a sidewall. Further, as shown in FIG. 5, when the third bracket 300 is of a rectangular structure, the third bracket 300 may be considered to be formed by connecting two pairs of mutually-parallel sidewalls. For ease of description, one pair of mutually-parallel sidewalls may be referred to as fifth sidewalls 350, and the other pair of mutually-parallel sidewalls may be referred to as sixth sidewalls 360.

Further, as shown in FIG. 5, the two fifth sidewalls 350 of the third bracket 300 are located on outer sides of the two third sidewalls 230 of the second bracket 200, and the two sixth sidewalls 360 of the third bracket 300 are located on outer sides of the two fourth sidewalls 240 of the second bracket 200. Each sixth sidewall 360 of the third bracket 300 is provided with one fourth bearing-shaft connection hole 364, and the fourth bearing-shaft connection hole 364 is coaxial to the third bearing-shaft connection hole 243. The second connection assembly 600 is arranged between the second bracket 200 and the third bracket 300. The second connection assembly 600 includes a second bearing 610 and a second shaft 620. One end of the second shaft 620 is arranged to penetrate through an inner ring of the second bearing 610, to form a bearing-shaft connection with the inner ring of the second bearing 610. The other end of the second shaft 620 is arranged to penetrate through the third bearing-shaft connection hole 243, to form a bearing-shaft connection with the third bearing-shaft connection hole 243. The second bearing 610 after being fitted with the second shaft 620 is arranged in the fourth bearing-shaft connection hole 364, so that an outer ring of the second bearing 610 forms a bearing-shaft connection with the fourth bearing-shaft connection hole 364. In this way, based on the structure shown in FIG. 5, the second bracket 200 and the third bracket 300 form a rotational connection about the second rotation axis L2 by using the second connection assembly 600.

It should be noted that, as shown in FIG. 5, corresponding to the two third bearing-shaft connection holes 243 of the second bracket 200 and the two fourth bearing-shaft connection holes 364 of the third bracket 300, the first embodiment may include two second connection assemblies 600.

Further, as shown in FIG. 5, at least one second driving assembly 800 is further arranged between the second bracket 200 and the third bracket 300. Each second driving assembly 800 includes one second magnet 810 and one second coil 820 that are respectively arranged on the third sidewall 230 of the second bracket 200 and the fifth sidewall 350 of the third bracket 300. The second driving assembly 800 is offset from the second rotation axis L2, so that the second bracket 200 and the third bracket 300 can be driven to produce relative rotation about the second rotation axis L2.

In an embodiment, as shown in FIG. 5, when the second bracket 200 and the third bracket 300 are of a rectangular structure, four second driving assemblies 800 are arranged between the second bracket 200 and the third bracket 300, and each two of the four second driving assemblies 800 serve as one group and are symmetrically distributed on two sides of the second rotation axis L2. For example, two second coils 820 are arranged on each third sidewall 230 of the second bracket 200; and two second magnets 810 are arranged on each fifth sidewall 350 of the third bracket 300. When the second bracket 200 is nested with the third bracket 300, in each second driving assembly 800, the second coil 820 and the second magnet 810 are distributed in parallel along the direction of the first rotation axis L1, and the second coil 820 is located in a magnetic field generated by the second magnet 810. When the second coil 820 is energized, according to Fleming's Left-Hand Rule, the second coil 820 generates an ampere force F2 perpendicular to a direction of the magnetic field and a current direction (parallel to the direction of the optical axis C1). Therefore, by setting current directions of the second coils 820 on the two sides of the second rotation axis L2, directions of ampere forces F2 on the two sides of the second rotation axis L2 may be opposite, thereby forming rotational torque with the second rotation axis L2 as a center of an arm of force, to drive the second bracket 200 and the third bracket 300 to produce relative rotation about the second rotation axis L2.

Figure 6:
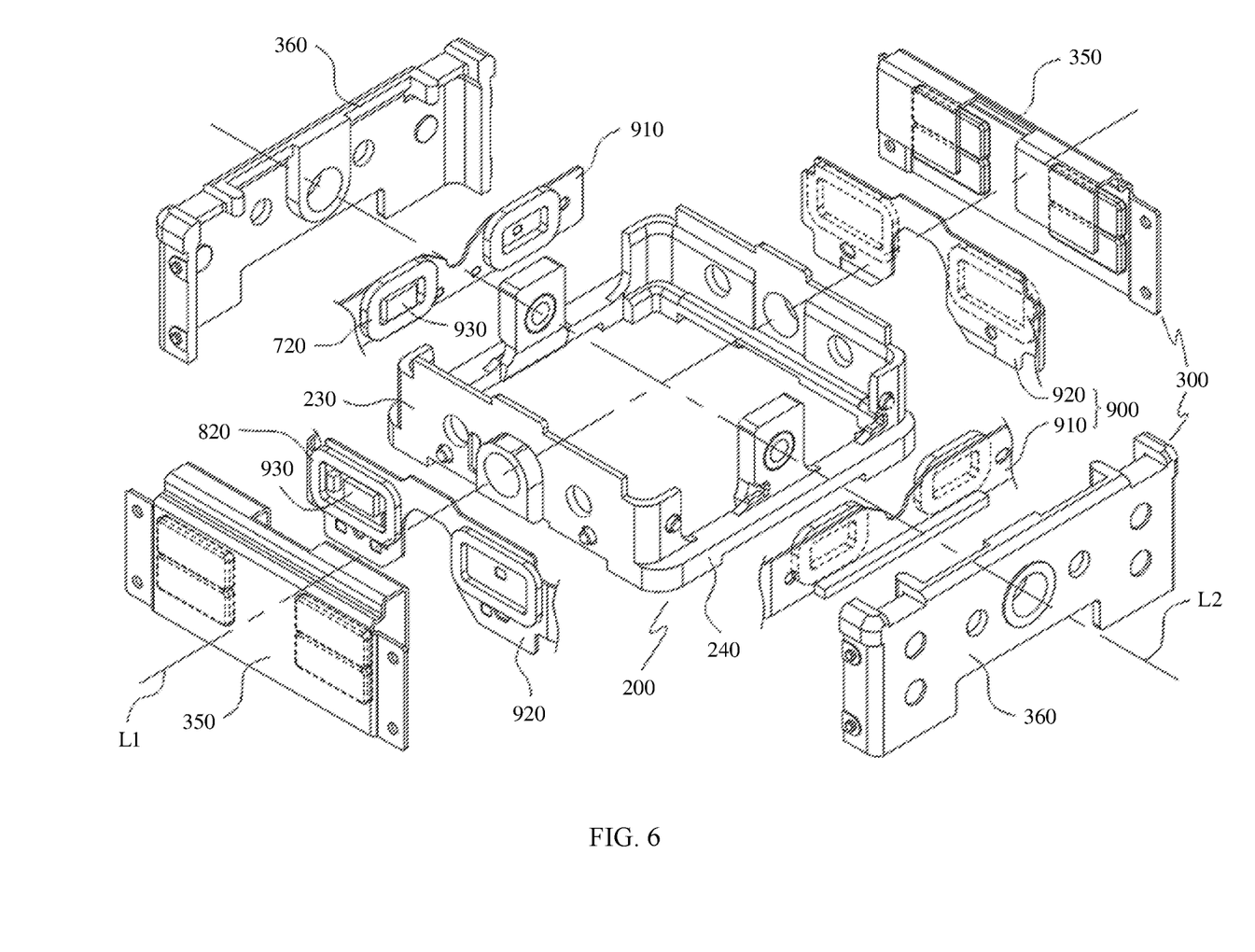
FIG. 6 is a schematic structural matching diagram of the second bracket, the third bracket, and a flexible printed circuit board according to the first embodiment.

In some embodiments, a flexible circuit board 900 is further arranged between the second bracket 200 and the third bracket 300. FIG. 6 is a schematic structural matching diagram of the second bracket 200, the third bracket 300, and the flexible circuit board 900 according to the first embodiment. For ease of description of a matching relationship among the second bracket 200, the third bracket 300, the flexible circuit board 900, and another component, in FIG. 6, structures of the flexible circuit board 900 and the third bracket 300 are broken down along the direction of the first rotation axis L1 and the direction of the second rotation axis L2. As shown in FIG. 6, the flexible circuit board 900 has an annular structure matching the shape of the second bracket 200. For example, when the second bracket 200 is of a rectangular structure, the flexible circuit board 900 is also of a rectangular structure. The flexible circuit board 900 further includes at least one driving IC 930. The flexible circuit board 900 is configured to be coupled to a first coil 720 and a second coil 820, and provide a driving current for the first coil 720 and the second coil 820 by using the at least one driving IC 930.

Further, as shown in FIG. 6, when the flexible circuit board 900 is of a rectangular structure, the flexible circuit board 900 may be considered as including two pairs of mutually-parallel board surfaces. For ease of description, one pair of mutually-parallel board surfaces may be referred to as first board surfaces 910, and the other pair of mutually-parallel board surfaces may be referred to as second board surfaces 920. In a description manner of FIG. 6, the first board surface 910 is located on an outer side of the fourth sidewall 240, and the second board surface 920 is located on an outer side of the third sidewall 230.

Further, as shown in FIG. 6, the first coil 720 and the second coil 820 may be fixed on the flexible circuit board 900, where the first coil 720 is fixed on an inner side of the flexible circuit board 900, and the second coil 820 is fixed on an outer side of the flexible circuit board 900. When the flexible circuit board 900 is rectangular, the first coil 720 may be fixed on an inner side of the first board surface 910, where two first coils 720 are fixed on each first board surface 910; and the second coil 820 may be fixed on an outer side of the second board surface 920, where two second coils 820 are fixed on each second board surface 920.

Further, as shown in FIG. 6, the flexible circuit board 900 includes at least two driving ICs 930, where at least one driving IC 930 is configured to provide a driving current for the first coil 720, and at least one driving IC 930 is configured to provide a driving current for the second coil 820. The driving IC 930 may be arranged at a central position of any one or more first coils 720, and at a central position of any one or more second coils 820. When the driving IC 930 is arranged at the central position of the first coil 720, if the first bracket 100 and the second bracket 200 produce relative rotation, the driving IC 930 can sense a change of a magnetic field caused by the relative rotation, to feed back relative location information of the first bracket 100 and the second bracket 200 by using the change of the magnetic field. When the driving IC 930 is arranged at the central position of the second coil 820, if the second bracket 200 and the third bracket 300 produce relative rotation, the driving IC 930 may feed back relative position information of the second bracket 200 and the third bracket 300 by using a sensed change of a magnetic field.

Further, as shown in FIG. 6, the flexible circuit board 900 is arranged on an outer side of the second bracket 200 around the third sidewall 230 and the fourth sidewall 240 of the second bracket 200. The two first board surfaces 910, on which the first coils 720 are arranged, of the flexible circuit board 900 are attached to the outer sides of the two fourth sidewalls 240 of the second bracket 200. The two second board surfaces 920, on which the second coils 820 are arranged, of the flexible circuit board 900 are attached to the outer sides of the two third sidewalls 230 of the second bracket 200. The third bracket 300 is nested on an outer side of the flexible circuit board 900. The fifth sidewall 350 of the third bracket 300 is located on an outer side of the second board surface 920 of the flexible circuit board 900 and the sixth sidewall 360 of the third bracket 300 is located on an outer side of the first board surface 910 of the flexible circuit board 900.

Figure 7:
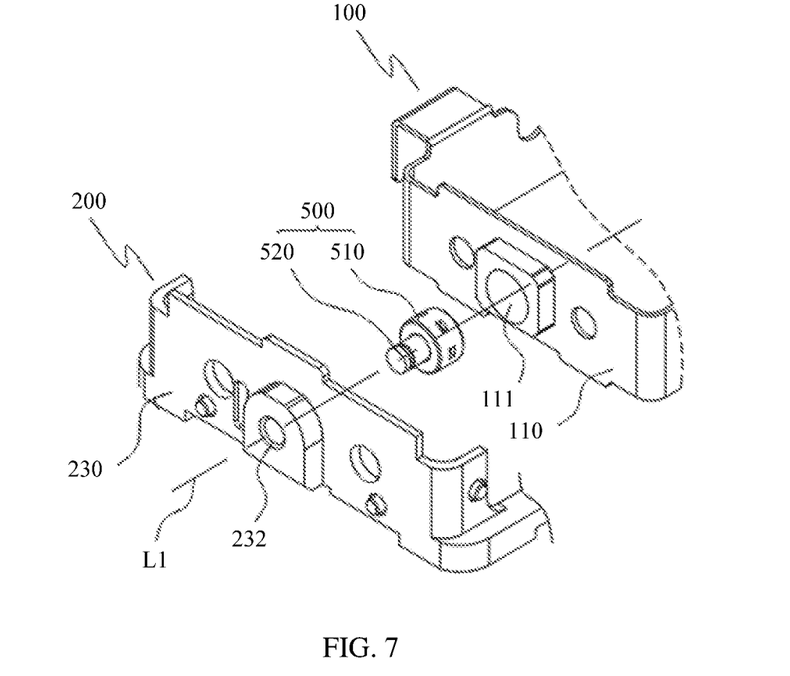
FIG. 7 is a schematic diagram of another connection manner between a first connection assembly and both of the first bracket and the second bracket according to the first embodiment.

FIG. 7 is a schematic diagram of another connection manner between the first connection assembly 500 and both of the first bracket 100 and the second bracket 200 according to the first embodiment. Compared with the connection manner shown in FIG. 4, in the connection manner shown in FIG. 7, a connection direction of the first connection assembly 500 is rotated. One end of the first shaft 520 is arranged to penetrate through the inner ring of the first bearing 510, to form a bearing-shaft connection with the inner ring of the first bearing 510. The other end of the first shaft 520 is arranged to penetrate through the second bearing-shaft connection hole 232, to form a bearing-shaft connection with the second bearing-shaft connection hole 232. The first bearing 510 after being fitted with the first shaft 520 is arranged in the first bearing-shaft connection hole 111, so that the outer ring of the first bearing 510 forms a bearing-shaft connection with the first bearing-shaft connection hole 111. In this way, based on the structure shown in FIG. 7, it is also possible to enable the first bracket 100 and the second bracket 200 to form a rotational connection about the first rotation axis L1 by using the first connection assembly 500.

Figure 8:
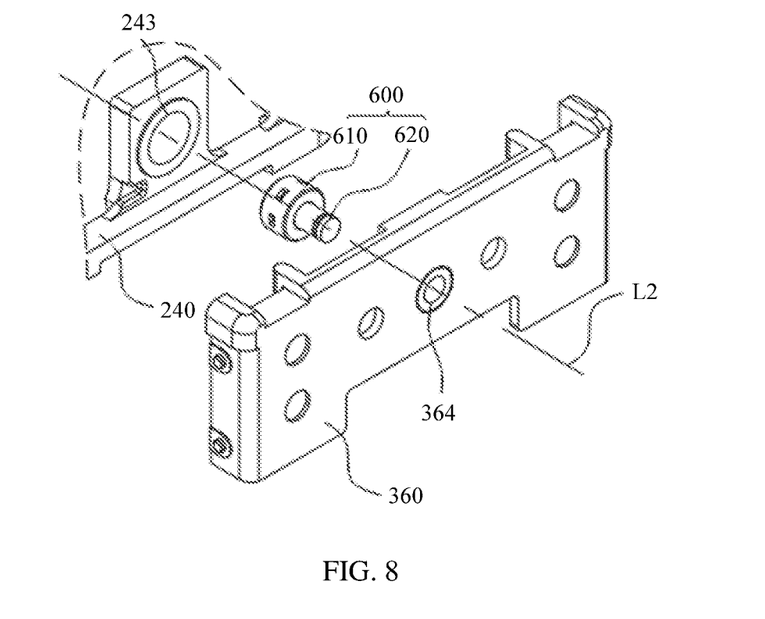
FIG. 8 is a schematic diagram of another connection manner between a second connection assembly and both of the second bracket and the third bracket according to the first embodiment.

FIG. 8 is a schematic diagram of another connection manner between the second connection assembly 600 and both of the second bracket 200 and the third bracket 300 according to the first embodiment. Compared with the connection manner shown in FIG. 5, in the connection manner shown in FIG. 8, a connection direction of the second connection assembly 600 is rotated. One end of the second shaft 620 is arranged to penetrate through the inner ring of the second bearing 610, to form a bearing-shaft connection with the inner ring of the second bearing 610. The other end of the second shaft 620 is arranged to penetrate through the fourth bearing-shaft connection hole 364, to form a bearing-shaft connection with the fourth bearing-shaft connection hole 364. The second bearing 610 after being fitted with the second shaft 620 is arranged in the third bearing-shaft connection hole 243, so that the outer ring of the second bearing 610 forms a bearing-shaft connection with the third bearing-shaft connection hole 243. In this way, based on the structure shown in FIG. 8, it is also possible to enable the second bracket 200 and the third bracket 300 to form a rotational connection about the second rotation axis L2 by using the second connection assembly 600.

With reference to FIG. 4 and FIG. 5, the following describes a principle of implementing large-angle optical image stabilization by using the optical image stabilization module in the first embodiment. The optical image stabilization module in the first embodiment may be applied to various electronic devices, for example, a mobile phone, a tablet computer, an aerial photography aircraft, a pan-tilt-zoom device, and a motion camera. The electronic device further includes various sensors used to sense a posture change of the electronic device, such as a gyroscope. When shooting a photo or a video, the electronic device obtains posture data (for example, an angular acceleration) of the electronic device measured by a sensor such as a gyroscope, and generates angle variation amounts corresponding to the first rotation axis L1 and the second rotation axis L2 of the optical image stabilization module based on the posture data. The driving IC 930 in the optical image stabilization module generates a driving current for the first coil 720 and the second coil 820 based on the angle variation amounts of the first rotation axis L1 and the second rotation axis L2. A magnitude of the driving current is determined based on the angle variation amounts of the first rotation axis L1 and the second rotation axis L2. In this way, the energized first coil 720 is subject to the ampere force F1 in the magnetic field of the first magnet 710, and drives the first bracket 100 and the optical lens module 400 to rotate relative to the second bracket 200 about the first rotation axis L1, to compensate for an angle variation generated by the electronic device about the first rotation axis L1, thereby implementing image stabilization of the optical lens module 400 about the first rotation axis L1. The energized second coil 820 is subject to the ampere force F2 in the magnetic field of the second magnet 810, and drives the second bracket 200 to rotate relative to the third bracket 300 about the second rotation axis L2. A relative position of the second bracket 200 and the first bracket 100 is fixed along the second rotation axis L2. Therefore, rotation of the second bracket 200 about the second rotation axis L2 also drives the first bracket 100 and the optical lens module 400 to rotate about the second rotation axis L2, to compensate for an angle variation generated by the electronic device about the second rotation axis L2, thereby implementing image stabilization of the optical lens module 400 about the second rotation axis L2. It can be understood that, compared with the structure in which the optical image stabilization module implements image stabilization by horizontal displacement shown in FIG. 1, the optical image stabilization module in the first embodiment can enable the optical lens module 400 to rotate about the first rotation axis L1 and the second rotation axis L2 that are perpendicular to each other, so that the optical lens module 400 maintains an original field of view, thereby implementing large-angle optical image stabilization. In addition, in the first embodiment, a mutually-independent structure is used to implement rotation of the optical lens module 400 about the first rotation axis L1 and rotation of the optical lens module 400 about the second rotation axis L2, so that the rotation of the optical lens module 400 about the first rotation axis L1 and the rotation of the optical lens module 400 about the second rotation axis L2 are independently decoupled without being affected by each other, thereby eliminating a posture variation possibly generated in an image stabilization process. In addition, in the first embodiment, a bearing and a shaft are used as support for a moving part (for example, the first bracket 100 and the second bracket 200), so that structural strength is strong, and when the electronic device falls off or is hit, damage is not likely to occur, thereby improving device reliability.

The following is a second embodiment.

The second embodiment provides an optical image stabilization module. A difference between the second embodiment and the first embodiment lies in that a relative position of a driving assembly (including a first driving assembly 700 and a second driving assembly 800) and a connection assembly (including a first connection assembly 500 and a second connection assembly 600) is different.

Figure 9:
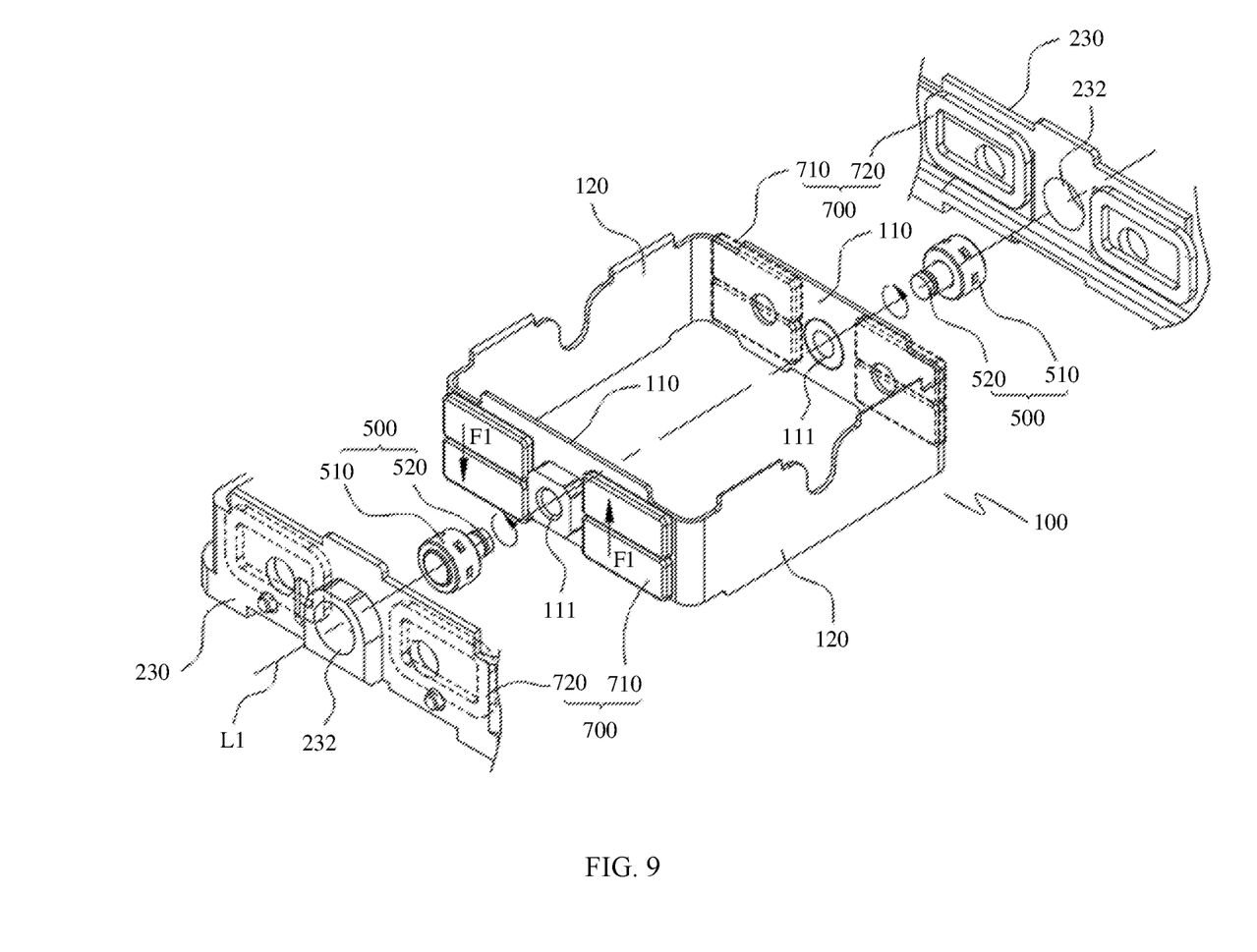
FIG. 9 is a schematic diagram of connection between a first bracket and a second bracket according to a second embodiment.

FIG. 9 is a schematic diagram of connection between a first bracket 100 and a second bracket 200 according to the second embodiment. For ease of description of a connection relationship between the first bracket 100 and the second bracket 200, in FIG. 9, the second bracket 200 is truncated, and a structure of the second bracket 200 is broken down along a direction of a first rotation axis L1 (a third sidewall 230 of the second bracket 200 is not fully shown in FIG. 9). As shown in FIG. 9, different from the first embodiment (referring to FIG. 4), the first driving assembly 700 is distributed on a first sidewall 110 of the first bracket 100 and the third sidewall 230 of the second bracket 200. Two first magnets 710 are arranged on each first sidewall 110 of the first bracket 100, and the two first magnets 710 are symmetrically distributed on two sides of the first rotation axis L1; and two first coils 720 are arranged on each third sidewall 230 of the second bracket 200, and the two first coils 720 are symmetrically distributed on the two sides of the first rotation axis L1. When the first bracket 100 is nested with the second bracket 200, in each first driving assembly 700, the first coil 720 and the first magnet 710 are distributed in parallel, so that the first coil 720 is located in a magnetic field generated by the first magnet 710. When the first coil 720 is energized, according to Fleming's Left-Hand Rule, the first coil 720 generates an ampere force F1 perpendicular to a direction of the magnetic field and a current direction (parallel to a direction of an optical axis C1). Therefore, if current directions of the first coils 720 on the two sides of the first rotation axis L1 are opposite, directions of ampere forces F1 on the two sides of the first rotation axis L1 are also opposite, thereby forming rotational torque with the first rotation axis L1 as a center of an arm of force, to drive the first bracket 100 and the second bracket 200 to produce relative rotation about the first rotation axis L1.

Figure 10:
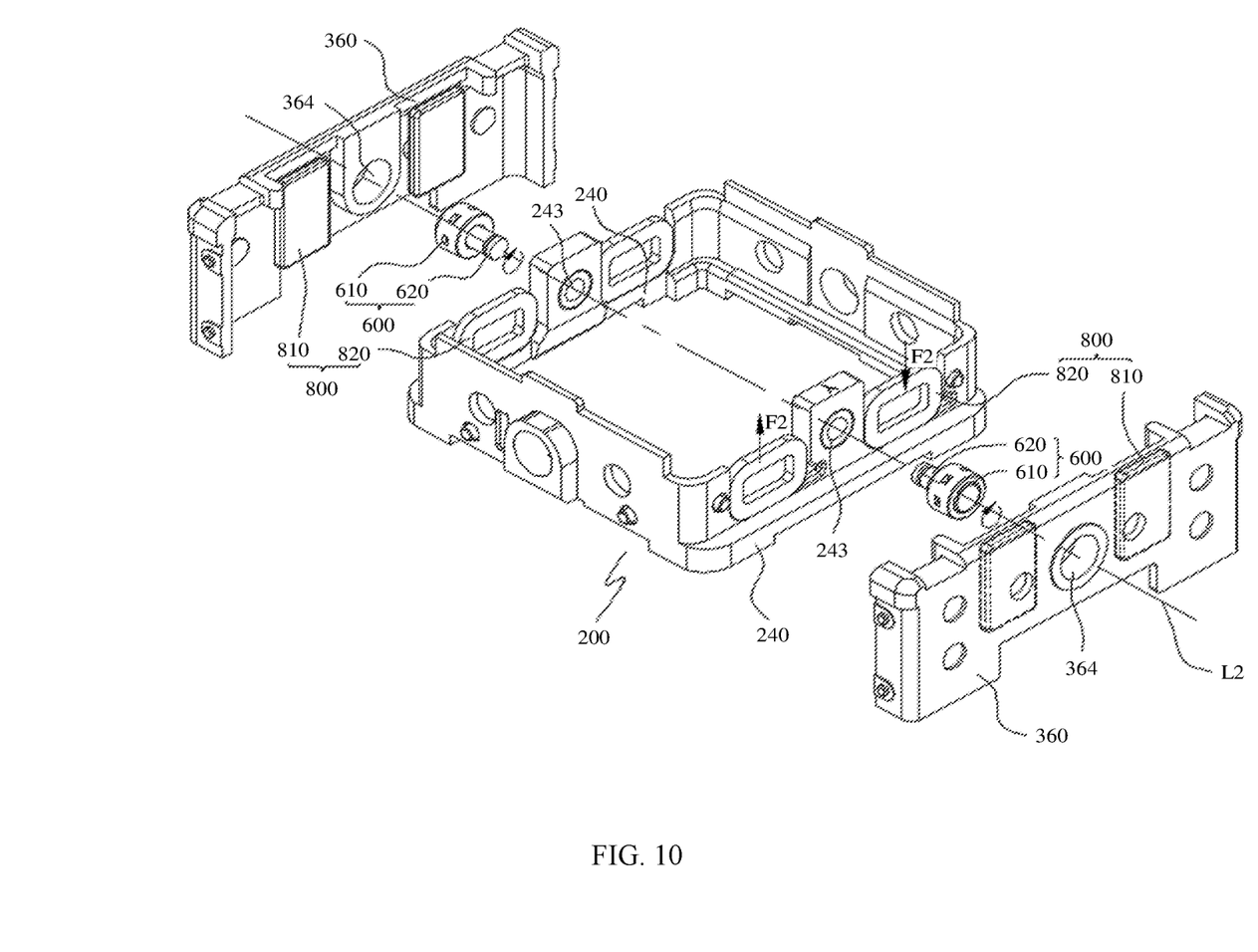
FIG. 10 is a schematic diagram of connection between the second bracket and a third bracket according to the second embodiment.

FIG. 10 is a schematic diagram of connection between the second bracket 200 and a third bracket 300 according to the second embodiment. For ease of description of a connection relationship between the second bracket 200 and the third bracket 300, in FIG. 10, the third bracket 300 is truncated, and a structure of the third bracket 300 is broken down along a direction of a second rotation axis L2 (a fifth sidewall 350 of the third bracket 300 is not shown in FIG. 10). As shown in FIG. 10, different from the first embodiment (referring to FIG. 5), the second driving assembly 800 is distributed on a fourth sidewall 240 of the second bracket 200 and a sixth sidewall 360 of the third bracket 300. Two second magnets 810 are arranged on each sixth sidewall 360 of the third bracket 300, and the two second magnets 810 are symmetrically distributed on two sides of the second rotation axis L2; and two second coils 820 are arranged on each fourth sidewall 240 of the second bracket 200, and the two second coils 820 are symmetrically distributed on the two sides of the second rotation axis L2. When the second bracket 200 is nested with the third bracket 300, in each second driving assembly 800, the second coil 820 and the second magnet 810 are distributed in parallel, so that the second coil 820 is located in a magnetic field generated by the second magnet 810. When the second coil 820 is energized, according to Fleming's Left-Hand Rule, the second coil 820 generates an ampere force F2 perpendicular to a direction of the magnetic field and a current direction (parallel to the direction of the optical axis C1). Therefore, if current directions of the second coils 820 on the two sides of the second rotation axis L2 are opposite, directions of ampere forces F2 on the two sides of the second rotation axis L2 are also opposite, thereby forming rotational torque with the second rotation axis L2 as a center of an arm of force, to drive the second bracket 200 and the third bracket 300 to produce relative rotation about the second rotation axis L2.

Therefore, the second embodiment can achieve a same effect as the first embodiment.

It is easy to understand that, in the second embodiment, a magnitude of rotational torque generated when a coil (including the first coil 720 and the second coil 820) is energized is related to a magnitude of an ampere force generated by the coil, and a length of an arm of force of the ampere force. The magnitude of the ampere force generated by the coil is determined by a magnitude of a current flowing through the coil, a quantity of coil turns, and strength of the magnetic field, and the length of the arm of force is determined by a distance between the coil and a rotation axis. Therefore, to obtain an appropriate rotational torque, the distance between the coil and the rotation axis (including a distance between the first coil 720 and the first rotation axis L1, and a distance between the second coil 820 and the second rotation axis L2) is variable, that is, the coil and the rotation axis are not limited to fixed locations.

The third embodiment provides an electronic device. The electronic device may be, for example, a mobile phone, a tablet computer, an aerial photography aircraft, a pan-tilt-zoom device, and a motion camera.

Figure 11:
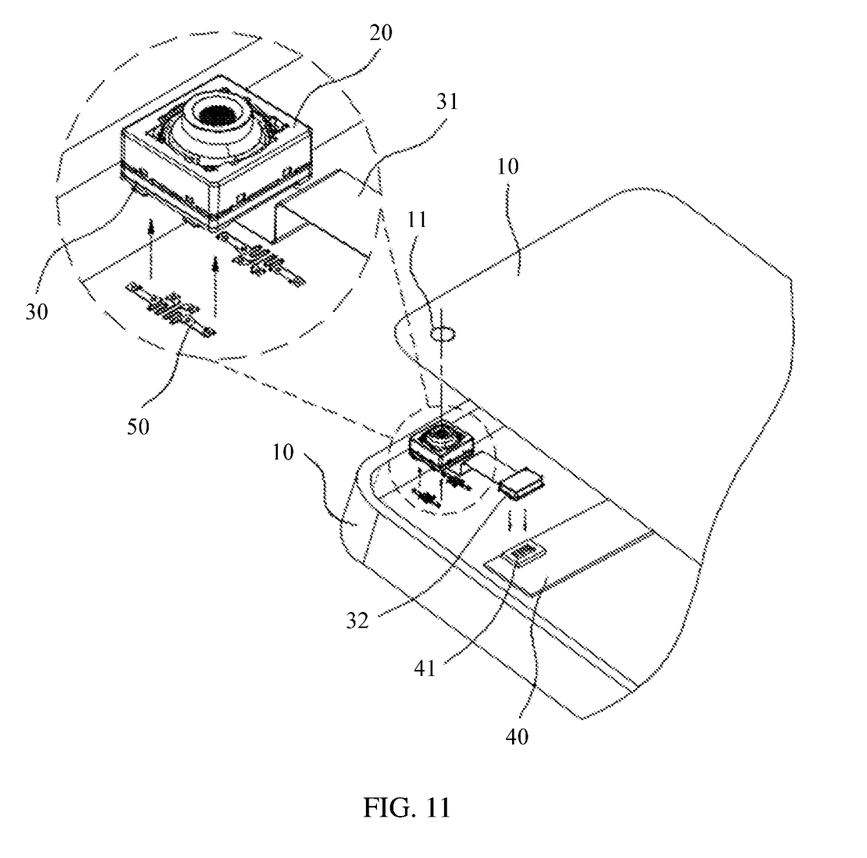
FIG. 11 is a schematic diagram of a structure of an electronic device according to an embodiment.

FIG. 11 is a schematic structural diagram of the electronic device. As shown in FIG. 11, the electronic device includes a housing 10, where the housing 10 includes at least one camera hole 11; the optical image stabilization module 20 according to the first embodiment or the second embodiment, where the optical image stabilization module 20 is arranged in the camera hole 11 and configured to collect an optical image by using the camera hole 11; an image sensor 30, arranged on a light outlet side of the optical image stabilization module 20 and configured to receive the optical image collected by the optical image stabilization module 20 and convert the optical image into a digital electrical signal; a module flexible printed circuit board (FPC) 31, where the module FPC 31 is electrically coupled to the image sensor 30, and the module FPC 31 is further provided with a conducting terminal 32; one or more springs 50 further arranged between the optical image stabilization module 20 and the image sensor 30; and a printed circuit board (PCB) 40, arranged in the housing 10, where the PCB 40 is provided with a conducting socket 41, and the image sensor 30 and the PCB 40 are electrically coupled by plug-connection of the conducting terminal 32 of the module FPC 31 and the conducting socket 41 of the PCB 40. In this embodiment, the flexible circuit board 900 in the optical image stabilization module 20 is electrically coupled to the image sensor 30 by using the one or more springs 50, thereby implementing that the flexible circuit board 900 and the image sensor 30 are connected to the printed circuit board (PCB) 40 by sharing the module FPC 31. Therefore, the optical image stabilization module 20 does not need to be additionally provided with another FPC, which helps reduce a volume of the optical image stabilization module 20.

The electronic device in this embodiment further includes various sensors used to sense a posture change of the electronic device, such as a gyroscope. When shooting a photo or a video, the electronic device obtains posture data (for example, an angular acceleration) of the electronic device measured by a sensor such as a gyroscope, and generates angle variation amounts corresponding to the first rotation axis L1 and the second rotation axis L2 of the electronic device based on the posture data. The electronic device generates a driving current for the first coil 720 and the second coil 820 by using the driving IC 930 in the optical image stabilization module based on the angle variation amounts of the first rotation axis L1 and the second rotation axis L2. A magnitude of the driving current is determined based on the angle variation amounts of the first rotation axis L1 and the second rotation axis L2. In this way, the energized first coil 720 is subject to an ampere force F1 in a magnetic field of the first magnet 710, and drives the first bracket 100 and the optical lens module 400 to rotate relative to the second bracket 200 about the first rotation axis L1, to compensate for an angle variation generated by the electronic device about the first rotation axis L1, thereby implementing image stabilization of the optical lens module 400 about the first rotation axis L1. The energized second coil 820 is subject to an ampere force F2 in a magnetic field of the second magnet 810, and drives the second bracket 200 to rotate relative to the third bracket 300 about the second rotation axis L2. A relative position of the second bracket 200 and the first bracket 100 is fixed along the second rotation axis L2. Therefore, rotation of the second bracket 200 about the second rotation axis L2 also drives the first bracket 100 and the optical lens module 400 to rotate about the second rotation axis L2, to compensate for an angle variation generated by the electronic device about the second rotation axis L2, thereby implementing image stabilization of the optical lens module 400 about the second rotation axis L2. In this way, in the electronic device according to the third embodiment, the optical image stabilization module can enable the optical lens module 400 to rotate about the first rotation axis L1 and the second rotation axis L2 that are perpendicular to each other, so that the optical lens module 400 maintains an original field of view, thereby implementing large-angle optical image stabilization. In addition, the optical lens module uses a mutually-independent structure to implement rotation of the optical lens module 400 about the first rotation axis L1 and rotation of the optical lens module 400 about the second rotation axis L2, so that the rotation of the optical lens module 400 about the first rotation axis L1 and the rotation of the optical lens module 400 about the second rotation axis L2 are independently decoupled without being affected by each other, thereby eliminating a posture variation possibly generated in an image stabilization process. In addition, the optical lens module uses a bearing and a shaft as support for a moving part (for example, the first bracket 100 and the second bracket 200), so that structural strength is strong, and when the electronic device falls off or is hit, damage is not likely to occur, thereby improving device reliability.

What is claimed is:

1. An optical image stabilization module, comprising:
a first bracket, wherein the first bracket is of an annular structure and forms a hollow cavity;
an optical lens module arranged in the hollow cavity and fixed on the first bracket, wherein an optical axis of the optical lens module is parallel to a central axis of the hollow cavity;
a second bracket, wherein the second bracket is nested on an outer side of the first bracket;
a first connection assembly arranged between the first bracket and the second bracket, wherein the first bracket and the second bracket form a rotational connection about a first rotation axis by using the first connection assembly, and the first rotation axis is perpendicular to the optical axis;
a third bracket, wherein the third bracket is nested on an outer side of the second bracket; and
a second connection assembly arranged between the second bracket and the third bracket, wherein the second bracket and the third bracket form a rotational connection about a second rotation axis by using the second connection assembly, the second rotation axis is perpendicular to the optical axis and the first rotation axis, rotation of the optical lens module by first angle variation amounts about the first rotation axis is independently decoupled from rotation of the optical lens module by second angle variation amounts about the second rotation axis, both the first angle variation amounts and the second angle variation amounts are generated based upon measurement of posture data by a sensor, and a magnitude of a driving current is determined based on both the first angle variation amounts and the second angle variation amounts.

2. The optical image stabilization module according to claim 1, wherein the optical image stabilization module comprises two first connection assemblies, and the two first connection assemblies are passed through by the first rotation axis and are symmetrically arranged between the first bracket and the second bracket relative to the second rotation axis.

3. The optical image stabilization module according to claim 2, further comprising:
a first driving assembly arranged between the first bracket and the second bracket, wherein the first driving assembly is offset from the first rotation axis and is configured to drive the first bracket and the second bracket to produce relative rotation about the first rotation axis.

4. The optical image stabilization module according to claim 3, wherein there are at least two first driving assemblies, and the at least two first driving assemblies are symmetrically distributed between the first bracket and the second bracket relative to the first rotation axis.

5. The optical image stabilization module according to claim 2, further comprising:
a second driving assembly arranged between the second bracket and the third bracket, wherein the second driving assembly is offset from the second rotation axis and is configured to drive the second bracket and the third bracket to produce relative rotation about the second rotation axis.

6. The optical image stabilization module according to claim 5, wherein there are at least two second driving assemblies, and the at least two second driving assemblies are symmetrically distributed between the second bracket and the third bracket relative to the second rotation axis.

7. The optical image stabilization module according to claim 1, wherein the optical image stabilization module comprises two second connection assemblies, and the two second connection assemblies are passed through by the second rotation axis and are symmetrically arranged between the second bracket and the third bracket relative to the first rotation axis.

8. The optical image stabilization module according to claim 7, further comprising:
a first driving assembly arranged between the first bracket and the second bracket, wherein the first driving assembly is offset from the first rotation axis and is configured to drive the first bracket and the second bracket to produce relative rotation about the first rotation axis.

9. The optical image stabilization module according to claim 7, further comprising:
a second driving assembly arranged between the second bracket and the third bracket, wherein the second driving assembly is offset from the second rotation axis and is configured to drive the second bracket and the third bracket to produce relative rotation about the second rotation axis.

10. The optical image stabilization module according to claim 1, further comprising:
a first driving assembly arranged between the first bracket and the second bracket, wherein the first driving assembly is offset from the first rotation axis and is configured to drive the first bracket and the second bracket to produce relative rotation about the first rotation axis.

11. The optical image stabilization module according to claim 10, wherein there are at least two first driving assemblies, and the at least two first driving assemblies are symmetrically distributed between the first bracket and the second bracket relative to the first rotation axis.

12. The optical image stabilization module according to claim 1, further comprising:
a second driving assembly arranged between the second bracket and the third bracket, wherein the second driving assembly is offset from the second rotation axis and is configured to drive the second bracket and the third bracket to produce relative rotation about the second rotation axis.

13. The optical image stabilization module according to claim 12, wherein there are at least two second driving assemblies, and the at least two second driving assemblies are symmetrically distributed between the second bracket and the third bracket relative to the second rotation axis.

14. An electronic device comprising:
a housing, wherein the housing comprises at least one camera hole;
at least one optical image stabilization module, wherein the at least one optical image stabilization module is arranged in the at least one camera hole;
an image sensor arranged on a light outlet side of the optical image stabilization module;
a module flexible printed circuit board (FPC), wherein the module FPC is electrically coupled to the image sensor, and the module FPC is further provided with a conducting terminal;
a printed circuit board (PCB) arranged in the housing, wherein the PCB is provided with a conducting socket, and the conducting terminal is plug-connected to the conducting socket;
wherein the at least one optical image stabilization module further comprises:
a first bracket, wherein the first bracket is of an annular structure and forms a hollow cavity; an optical lens module arranged in the hollow cavity and fixed on the first bracket, wherein an optical axis of the optical lens module is parallel to a central axis of the hollow cavity;
a second bracket, wherein the second bracket is nested on an outer side of the first bracket;
a first connection assembly arranged between the first bracket and the second bracket, wherein the first bracket and the second bracket form a rotational connection about a first rotation axis by using the first connection assembly, and the first rotation axis is perpendicular to the optical axis;
a third bracket, wherein the third bracket is nested on an outer side of the second bracket; and
a second connection assembly arranged between the second bracket and the third bracket, wherein the second bracket and the third bracket form a rotational connection about a second rotation axis by using the second connection assembly, the second rotation axis is perpendicular to the optical axis and the first rotation axis, rotation of the optical lens module by first angle variation amounts about the first rotation axis is independently decoupled from rotation of the optical lens module by second angle variation amounts about the second rotation axis, both the first angle variation amounts and the second angle variation amounts are generated based upon measurement of posture data by a sensor, and a magnitude of a driving current is determined based on both the first angle variation amounts and the second angle variation amounts.

15. The electronic device according to claim 14, wherein the optical image stabilization module comprises two first connection assemblies, and the two first connection assemblies are passed through by the first rotation axis and are symmetrically arranged between the first bracket and the second bracket relative to the second rotation axis.

16. The electronic device according to claim 14, wherein the optical image stabilization module comprises two second connection assemblies, and the two second connection assemblies are passed through by the second rotation axis and are symmetrically arranged between the second bracket and the third bracket relative to the first rotation axis.

17. The electronic device according to claim 14, further comprising:
a first driving assembly arranged between the first bracket and the second bracket, wherein the first driving assembly is offset from the first rotation axis and is configured to drive the first bracket and the second bracket to produce relative rotation about the first rotation axis.

18. The electronic device according to claim 17, wherein there are at least two first driving assemblies, and the at least two first driving assemblies are symmetrically distributed between the first bracket and the second bracket relative to the first rotation axis.

19. The electronic device according to claim 14, further comprising:
a second driving assembly arranged between the second bracket and the third bracket, wherein the second driving assembly is offset from the second rotation axis and is configured to drive the second bracket and the third bracket to produce relative rotation about the second rotation axis.

20. The electronic device according to claim 19, wherein there are at least two second driving assemblies, and the at least two second driving assemblies are symmetrically distributed between the second bracket and the third bracket relative to the second rotation axis.

* * * * *